US012491394B2

(12) United States Patent
Park et al.

(10) Patent No.: US 12,491,394 B2
(45) Date of Patent: Dec. 9, 2025

(54) BATTERY FIRE SUPPRESSION SYSTEM WITH FIRE EXTINGUISHING AGENT COOLING FUNCTION

(71) Applicant: Ankug Engineering Co., Ltd., Seoul (KR)

(72) Inventors: Jae Man Park, Goyang-si (KR); Geon Seok Lee, Siheung-si (KR)

(73) Assignee: Ankug Engineering Co., Ltd., Seoul (KR)

( * ) Notice: Subject to any disclaimer, the term of this patent is extended or adjusted under 35 U.S.C. 154(b) by 419 days.

(21) Appl. No.: 18/069,862

(22) Filed: Dec. 21, 2022

(65) Prior Publication Data

US 2023/0271042 A1 Aug. 31, 2023

(30) Foreign Application Priority Data

Feb. 28, 2022 (KR) ........................ 10-2022-0025915

(51) Int. Cl.

*A62C 35/13* (2006.01)
*A62C 3/16* (2006.01)
*A62C 5/00* (2006.01)
*F28D 7/16* (2006.01)

(52) U.S. Cl.

CPC ................ *A62C 35/13* (2013.01); *A62C 3/16* (2013.01); *A62C 5/008* (2013.01); *F28D 7/1623* (2013.01)

(58) Field of Classification Search

CPC . A62C 3/16; A62C 35/13; A62C 5/008; F28F 9/005; F28F 9/0268; F28F 9/22; F28F 1/32; F28D 7/082; F28D 7/1623

See application file for complete search history.

(56) References Cited

U.S. PATENT DOCUMENTS 4,120,267 A * 10/1978 Wood ........................ F22D 1/08 122/367.3
2009/0014187 A1* 1/2009 Wagner .................. A62C 3/004 169/45

(Continued)

FOREIGN PATENT DOCUMENTS

JP 3108869 B2 11/2000
KR 10-2154314 B1 9/2020

(Continued)

*Primary Examiner* — Cody J Lieuwen
(74) *Attorney, Agent, or Firm* — Studebaker Brackett PLLC

(57) ABSTRACT

Proposed is a battery fire suppression system with a fire extinguishing agent cooling function, in which a fire extinguishing gas serves as a refrigerant for cooling a fire extinguishing agent and at the same time, the fire extinguishing gas is sprayed into a battery room or a battery module to quickly extinguish a fire in the battery. While allowing the fire extinguishing gas to basically serve as the refrigerant, depending on the amount of combustible materials loaded in the battery room, the shape of battery cells installed inside the battery module, the battery capacity, etc., it is possible to selectively determine whether to allow the fire extinguishing gas to serve only as the refrigerant, or to allow the fire extinguishing gas to be sprayed to the battery module where the fire has occurred to cool the surface of the battery module or directly extinguish the fire in the battery module.

4 Claims, 11 Drawing Sheets

(56) References Cited

U.S. PATENT DOCUMENTS

| | | | | |
|---|---|---|---|---|
| 2011/0259613 | A1* | 10/2011 | Morris | A62C 35/64 137/357 |
| 2017/0043194 | A1* | 2/2017 | Ling | A62C 37/08 |
| 2017/0256831 | A1* | 9/2017 | Hong | H01M 10/482 |
| 2022/0074677 | A1* | 3/2022 | Wagner | F28D 20/0056 |
| 2022/0123383 | A1* | 4/2022 | Lee | H01M 50/262 |
| 2022/0367944 | A1* | 11/2022 | Park | A62C 99/0009 |
| 2023/0163409 | A1* | 5/2023 | Shin | H01M 50/383 429/53 |

FOREIGN PATENT DOCUMENTS

| | | | |
|---|---|---|---|
| KR | 10-2232707 | B1 | 3/2021 |
| KR | 10-2021-0076261 | A | 6/2021 |
| KR | 10-2022-0004854 | A | 1/2022 |
| WO | 2020/230944 | A1 | 11/2020 |

* cited by examiner

BATTERY FIRE SUPPRESSION SYSTEM WITH FIRE EXTINGUISHING AGENT COOLING FUNCTION

CROSS REFERENCE TO RELATED APPLICATION

The present application claims priority to Korean Patent Application No. 10-2022-0025915, filed Feb. 28, 2022, the entire contents of which is incorporated herein for all purposes by this reference.

BACKGROUND OF THE INVENTION

Field of the Invention

The present disclosure relates generally to a battery fire suppression system with a fire extinguishing agent cooling function and, more particularly, to a battery fire suppression system with a fire extinguishing agent cooling function that quickly suppresses a fire that has occurred in a battery.

This work was supported by the Technology Innovation Program (20011568, Development of Automatic Extinguishing System for ESS Fire) funded By the Ministry of Trade, Industry & Energy (MOTIE, Korea)".

Description of the Related Art

As global warming and environmental destruction issues emerge, the development and distribution of new and renewable energy is accelerating. In accordance with this trend, investment in new and renewable energy generation facilities such as solar power and wind power is expanding. However, such new and renewable energies including solar power and wind power has several drawbacks. That is, since its power generation output changes rapidly according to environmental conditions, energy supply and demand are not consistent. In addition, since power generation facilities are usually located in unpopulated places, energy supply efficiency is low due to being a long distance from the actual energy consumption area.

In an attempt to solve the above problems and secure energy supply stability, the development and distribution of energy storage systems (ESS) for storing produced energy are rapidly increasing. An energy storage system refers to a device that stores produced electricity in a battery and supplies the stored electricity when needed to thereby increase overall power use efficiency. However, there have been many fire accidents in such energy storage systems worldwide since 2018. This has hindered the distribution and technology development of energy storage systems, and raised serious concerns regarding fire safety.

In the case of on-land energy storage systems, since they are usually installed in unpopulated places, even if a fire occurs, there are no casualties but loss of properties. On the contrary, in the case of mobile energy storage systems, since they are usually installed in places where energy supply is needed, such as an event venue, if a fire occurs, many casualties are possible and it may lead to an additional fire. Thus, it is urgent to secure a high level of fire safety.

Meanwhile, fires in energy storage have the following characteristics. When a separator inside a battery is damaged by a specific cause, a violent reaction occurring in the battery leads to an explosion or fire of the battery (also called thermal runaway). As heat generated in this process is transferred to neighboring batteries, the fire propagates to the neighboring batteries and grows rapidly. In order to effectively extinguish such an ESS fire, it is essential to break a chain of reactions by simultaneously performing fire extinguishing of the battery where the fire has occurred and cooling of the neighboring batteries.

However, since a conventional fire suppression system for the energy storage systems is configured to extinguish the fire itself by simply discharging a fire extinguishing agent to the vicinity of the battery where the fire has occurred, there is no separate structure capable of cooling the neighboring batteries. Thus, limitations are imposed on quickly responding to a fire that has occurred in the battery.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent document 1) Korean Patent Application Publication No. 10-2022-0004854

SUMMARY OF THE INVENTION

Accordingly, the present disclosure has been made keeping in mind the above problems occurring in the related art, and the present disclosure provides a battery fire suppression system with a fire extinguishing agent cooling function, in which a fire extinguishing gas serves as a refrigerant for cooling a fire extinguishing agent and at the same time, the fire extinguishing gas is sprayed into a battery room or a battery module to quickly extinguish a fire in the battery.

In order to achieve the above objective, according to one aspect of the present disclosure, there is provided a battery fire suppression system with a fire extinguishing agent cooling function, the system including: a heat exchanger having, on a first side thereof, a first heat exchange inlet and a second heat exchange inlet and, on a second side thereof, a first heat exchange outlet and a second heat exchange outlet, the heat exchanger being provided with a cooling part therein that connects the second heat exchange inlet and the second heat exchange outlet to each other; an agent feeder configured to supply a fire extinguishing agent to the first heat exchange inlet; a gas feeder configured to supply a fire extinguishing gas to the second heat exchange inlet; and a connection member comprising a first connection part having a first side connected to the first heat exchange outlet and a second side extending toward a battery module, and a second connection part having a first side connected to the second heat exchange outlet and a second side extending toward the battery module, wherein the fire extinguishing gas flowing into the cooling part through the second heat exchange inlet may serve as a refrigerant for cooling the cooling part and then be discharged through the second heat exchange outlet, and the fire extinguishing agent flowing into the heat exchanger through the first heat exchange inlet may be discharged through the first heat exchange outlet in a state of being subjected to heat exchange with the cooling part.

The heat exchanger may include a main body having a space therein, a first closing part for closing a first end of the main body, and a second closing part for closing a second end of the main body, and the cooling part may be disposed in a serpentine shape inside the main body, wherein the first heat exchange inlet may be formed in the first closing part, the first heat exchange outlet may be formed in the second closing part, the second heat exchange inlet may be formed on a first side of the main body to be connected to a first end of the cooling part, and the second heat exchange outlet may be formed on a second side of the main body to be connected to a second end of the cooling part.

A plurality of cooling plates may be arranged in parallel inside the main body, the fire extinguishing agent flowing into the main body through the first heat exchange inlet may be divided and flow through the plurality of cooling plates along spaces between the cooling plates and then be discharged through the first heat exchange outlet, and the cooling part may be disposed in the serpentine shape while passing through the plurality of the cooling plates to exchange heat with the cooling plates.

A plurality of first branch plates may be provided at an inner first end portion of the main body and may be arranged so that each of the first branch plates radially extends from the first heat exchange inlet to a first end of each of the cooling plates, and a plurality of second branch plates may be provided at an inner second end portion of the main body and may be arranged so that each of the second branch plates radially extends from the first heat exchange outlet to a second end of each of the cooling plates.

The system may further include: a first fire detection sensor installed inside the battery module; a second fire detection sensor installed in a battery room in which the battery module is loaded; a control valve configured to selectively supply the fire extinguishing gas received from the gas feeder to the second heat exchange inlet or the connection member; and a controller configured to control the control valve to supply the fire extinguishing gas received from the gas feeder to the second heat exchange inlet when receiving a detection signal from the first fire detection sensor, and control the control valve to supply the fire extinguishing gas received from the gas feeder to the connection member when receiving a detection signal from the second fire detection sensor, wherein the connection member may further include a third connection part having a first side connected to the control valve and a second side positioned at a side of the battery room.

According to another aspect of the present disclosure, there is provided a battery fire suppression system with a fire extinguishing agent cooling function, the system including: an agitator having a space therein, and having, on a first side thereof, a first mixing inlet and a second mixing inlet and, on a second side thereof, a mixing outlet; an agent feeder configured to supply a fire extinguishing agent to the first mixing inlet; a gas feeder configured to supply a fire extinguishing gas to the second mixing inlet; and a connection member comprising a mixing connection part having a first side connected to the mixing outlet and a second side extending toward a battery module, wherein the fire extinguishing agent flowing into the agitator through the first mixing inlet may be cooled by being mixed with the fire extinguishing gas flowing into the agitator through the second mixing inlet.

According to another aspect of the present disclosure, there is provided a battery fire suppression system with a fire extinguishing agent cooling function, the system including: a heat exchanger having, on a first side thereof, a first heat exchange inlet and a second heat exchange inlet and, on a second side thereof, a first heat exchange outlet and a second heat exchange outlet, the heat exchanger being provided with a cooling part therein that connects the second heat exchange inlet and the second heat exchange outlet to each other; an agitator having a space therein, and having, on a first side thereof, a first mixing inlet and a second mixing inlet and, on a second side thereof, a mixing outlet; an agent feeder configured to supply a fire extinguishing agent; a gas feeder configured to supply a fire extinguishing gas; a first control valve configured to selectively supply the fire extinguishing agent received from the agent feeder to the first heat exchange inlet or the first mixing inlet; a second control valve configured to selectively supply the fire extinguishing gas received from the gas feeder to the second heat exchange inlet or the second mixing inlet; and a connection member having a first side connected to each of the first heat exchange outlet, the second heat exchange outlet, and the mixing outlet, and a second side extending toward a battery module.

The system may further include a controller configured to, when receiving a heat exchange mode selected among the heat exchange mode and a mode according to a user's manipulation, control the first control valve to supply the fire extinguishing agent received from the agent feeder to the first heat exchange inlet, and control the second control valve to supply the fire extinguishing gas received from the gas feeder to the second heat exchange inlet, wherein the fire extinguishing gas flowing into the cooling part through the second heat exchange inlet may serve as a refrigerant for cooling the cooling part and then be discharged through the second heat exchange outlet, and the fire extinguishing agent flowing into the heat exchanger through the first heat exchange inlet may be discharged through the first heat exchange outlet in a state of being subjected to heat exchange with the cooling part.

The system may further include a controller configured to, when receiving a mixing mode selected among a heat exchange mode and the mixing mode according to a user's manipulation, control the first control valve to supply the fire extinguishing agent received from the agent feeder to the first mixing inlet, and control the second control valve to supply the fire extinguishing gas received from the gas feeder to the second mixing inlet, wherein the fire extinguishing agent flowing into the agitator through the first mixing inlet may be cooled by being mixed with the fire extinguishing gas flowing into the agitator through the second mixing inlet.

The system may further include: a fire detection sensor installed inside the battery module and configured to detect a fire that has occurred in the battery module; and a controller configured to determine whether a temperature detected by the fire detection sensor exceeds a preset threshold limit, and to, when the temperature detected by the fire detection sensor exceeds the threshold limit, control the first control valve to supply the fire extinguishing agent received from the agent feeder to the first heat exchange inlet and control the second control valve to supply the fire extinguishing gas received from the gas feeder to the second heat exchange inlet, wherein the fire extinguishing gas flowing into the cooling part through the second heat exchange inlet may serve as a refrigerant for cooling the cooling part and then be discharged through the second heat exchange outlet, and the fire extinguishing agent flowing into the heat exchanger through the first heat exchange inlet may be discharged through the first heat exchange outlet in a state of being subjected to heat exchange with the cooling part.

The system may further include: a fire detection sensor installed inside the battery module and configured to detect heat and smoke generated in the battery module; and a controller configured to, when the fire detection sensor detects heat and smoke simultaneously or the fire detection sensor detects only smoke without detecting heat, control the first control valve to supply the fire extinguishing agent received from the agent feeder to the first mixing inlet and control the second control valve to supply the fire extinguishing gas received from the gas feeder to the second mixing inlet, wherein the fire extinguishing agent flowing into the agitator through the first mixing inlet may be cooled by being mixed with the fire extinguishing gas flowing into the agitator through the second mixing inlet.

The connection member may further include: a first connection part having a first side connected to the first heat exchange outlet and a second side extending toward the battery module; a second connection part having a first side connected to the second heat exchange outlet and a second side extending toward the battery module; and a mixing connection part having a first side connected to the mixing outlet and a second side extending toward the battery module.

The connection member may further include a first nozzle positioned to face an inside of the battery module and a second nozzle positioned at a side of a battery room in which the battery module is loaded, the second side of the first connection part may be connected to the first nozzle, and the second side of the second connection part may be connected to the second nozzle.

The connection member may further include a first nozzle positioned to face an inside of the battery module and a second nozzle positioned to face a surface of the battery module, the second side of the first connection part mat be connected to the first nozzle, and the second side of the second connection part may be connected to the second nozzle.

The connection member may further include a nozzle positioned to face an inside of the battery module, and the second side of the mixing connection part may be connected to the nozzle.

The system may further include a heat-sensitive insertion nozzle disposed on a side of the battery module, wherein the connection member may be connected to the heat-sensitive insertion nozzle, and the heat-sensitive insertion nozzle disposed on a side of a battery module where a fire has occurred among a plurality of battery modules may be opened by being melted, so that a fluid supplied from the connection member to the heat-sensitive insertion nozzle may be locally discharged to the battery module where the fire has occurred.

The system may further include an insertion nozzle inserted into a through-hole formed through a surface of the battery module, wherein the connection member may be connected to the insertion nozzle.

According to the present disclosure having the configuration as described above, the fire extinguishing agent is discharged from the heat exchanger to the battery module through the first connection portion and the first nozzle in a state of being cooled to a considerably low temperature. Thus, it is possible to quickly extinguish a fire that has occurred in the battery module and at the same time cool neighboring battery modules adjacent to the battery module where the fire has occurred, thereby blocking thermal runaway of the battery modules.

Furthermore, the fire extinguishing gas, which served as the refrigerant in the heat exchanger, is discharged to the battery module or other combustible materials through the second connection portion and the second nozzle. Thus, it is possible to prevent a fire in the battery room. In other words, the fire extinguishing gas not only can serve as the refrigerant, but also can prevent a fire by being sprayed around the battery room.

Furthermore, the fire extinguishing agent flowing into the main body can move to the cooling plates in a uniformly distributed state without being concentrated to either side inside the main body while passing through the first branch plates.

Furthermore, as the fire extinguishing agent is discharged through the first nozzle to the inside of the battery module where the fire has occurred, the cooled fire extinguishing agent extinguishes and cools the inside of the battery module. At the same time, the fire extinguishing gas is discharged through the second nozzle to the vicinity of the battery module where the fire has occurred, that is, the surface of the battery module, thereby cooling the outside of the battery module. Thus, it is possible to break a chain of reactions caused by the fire in the battery module.

Furthermore, while allowing the fire extinguishing gas to basically serve as the refrigerant, depending on the amount of combustible materials loaded in the battery room, the shape of battery cells installed inside the battery module, the battery capacity, etc., it is possible to selectively determine whether to allow the fire extinguishing gas to serve only as the refrigerant, or to allow the fire extinguishing gas to be sprayed to the battery module where the fire has occurred to cool the surface of the battery module or directly extinguish the fire in the battery module.

Furthermore, the fire extinguishing agent, the fire extinguishing gas, or the mixed agent is locally discharged through the perforation formed in the heat-sensitive insertion nozzle due to a fire or overheating of the battery module, it is possible to directly discharge the fire extinguishing agent, the fire extinguishing gas, or the mixed agent to the battery module where the fire or overheating has occurred.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, a battery fire suppression system with a fire extinguishing agent cooling function according to an exemplary embodiment of the present disclosure will be described in more detail with reference to the accompanying drawings.

Figure 1:
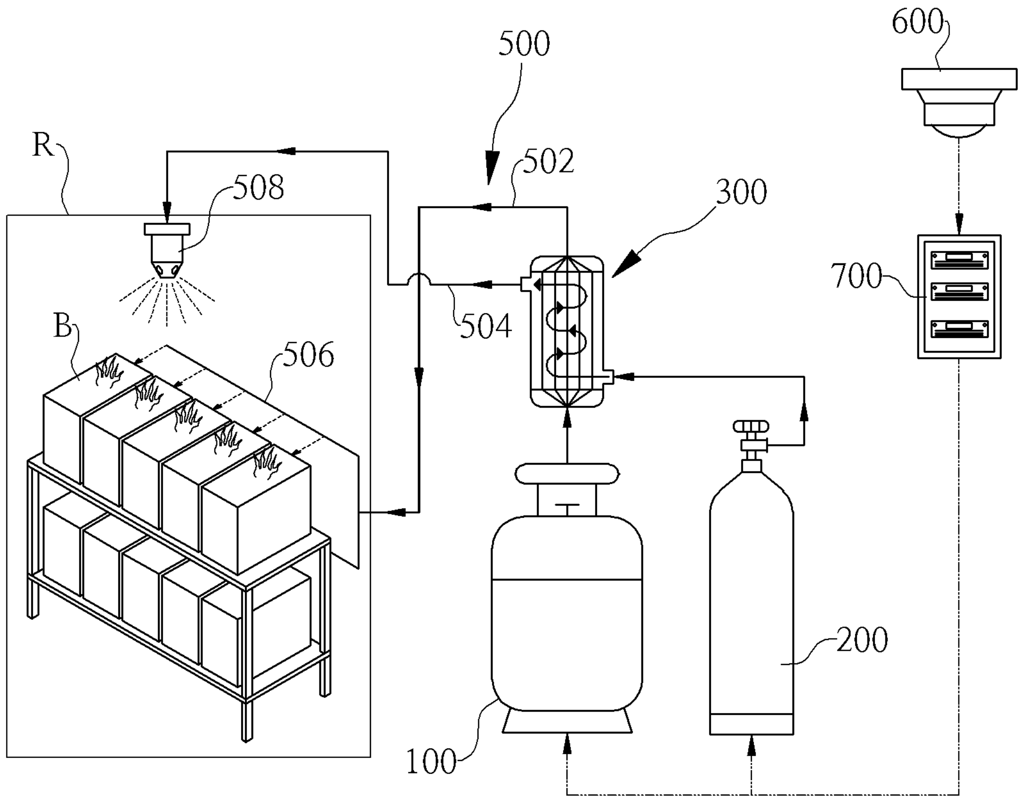
FIG. 1 is a schematic view illustrating a battery fire suppression system with a fire extinguishing agent cooling function according to a first exemplary embodiment of the present disclosure.

FIG. 1 is a schematic view illustrating a battery fire suppression system with a fire extinguishing agent cooling function according to a first exemplary embodiment of the present disclosure.

Referring to FIG. 1, the battery fire suppression system with the fire extinguishing agent cooling function according to the first exemplary embodiment of the present disclosure is for suppressing a fire that has occurred in an energy storage system (ESS), and includes a fire detection sensor 600, a controller 700, an agent feeder 100, a gas feeder 200, a heat exchanger 300, and a connection member 500.

The ESS may include an on-land ESS, a marine ESS, or a mobile ESS. The on-land ESS, the marine ESS, or the mobile ESS is configured so that a plurality of battery modules B are installed in a space of a battery room R or a loading box (not illustrated).

The fire detection sensor 600 is installed inside a battery module B, and is configured to generate a detection signal by detecting a fire that has occurred in the battery module B. For example, the fire detection sensor 600 generates a detection signal by detecting smoke or heat caused by a fire. In addition, the fire detection sensor 600 may be configured as a composite sensor that detects smoke and heat caused by a fire and generates different detection signals. In addition, the fire detection sensor 600 may be installed in the battery room R or the loading box (not illustrated) in some cases. A plurality of fire detection sensors 600 may be installed at regular intervals according to the size or number of the battery modules B. Although in FIG. 1 the fire detection sensor 600 is illustrated above the controller 700, this is a schematic illustration only. In the first exemplary embodiment of the present disclosure, it is understood that the fire detection sensor 600 is installed inside the battery module B.

The controller 700 is configured to determine that a fire has occurred in the battery room R when receiving the detection signal from the fire detection sensor 600, and control the agent feeder 100 and the gas feeder 200 to discharge a fire extinguishing agent and a fire extinguishing gas.

The fire extinguishing agent feeder 100 is filled with the fire extinguishing agent and discharges the fire extinguishing agent to the outside under control of the controller 700. The fire extinguishing agent may include, for example, Novec or reinforced liquid, and may include other known fire extinguishing agents. The agent feeder 100, the gas supply part 200, and the heat exchanger 300 may be located, for example, outside the battery room R.

The gas feeder 200 is filled with the fire extinguishing gas and discharges the fire extinguishing gas to the outside under control of the controller 700. The fire extinguishing gas may include a gaseous fire extinguishing agent, for example, carbon dioxide which can serve as a refrigerant.

The heat exchanger 300 (see FIG. 2) is configured to cool the fire extinguishing agent received from the agent feeder 100, and includes a main body 310 having a space therein, a first closing part 320 for closing a first end of the main body 310, and a second closing part 330 for closing a second end of the main body 310. A first heat exchange inlet 322 is formed in the first closing part 320, and a first heat exchange outlet 332 is formed in the second closing part 330. The first heat exchange inlet 322 is formed on a lower side of the main body 310, and the first heat exchange outlet 332 is formed on an upper side of the main body 310.

In addition, a tubular cooling part 340 (see FIG. 2) and a plate-shaped cooling plate 350 (see FIG. 2) are installed inside the main body 310. A first end of the cooling part 340 is connected to a second heat exchange inlet 312, and a second end of the cooling part 340 is connected to a second heat exchange outlet 314. The fire extinguishing gas flowing into the cooling part 340 through the second heat exchange inlet 312 serves as a refrigerant for cooling the cooling part 340 and then is discharged through the second heat exchange outlet 314. The cooling part 340 and the cooling plate 350 will be described later in detail with reference to FIG. 2.

The connection member 500 includes a first connection part 502, a second connection part 504, a first nozzle 506, and a second nozzle 508. The first connection portion 502 is formed in a tubular shape, and has a first side connected to the first heat exchange outlet 332 and a second side extending toward the battery module B. The second connection portion 504 is formed in a tubular shape, and has a first side connected to the second heat exchange outlet 314 and a second side extending toward the battery module B.

The first nozzle 506 is connected to the second side of the first connection portion 502, and is configured to discharge the fire extinguishing agent received from the first connection portion 502. The first nozzle 506 is installed, for example, to face the inside of the battery module B installed in the battery room R, and is configured to discharge the fire extinguishing agent to the inside of the battery module B. One or a plurality of first nozzles 506 may be provided according to the overall size of the battery module B. In addition, when a plurality of battery modules B are provided, the plurality of first nozzles 506 may be arranged so that each of the first nozzles 506 faces the inside of each of the battery modules B. The first connection portion 502 is integrally connected to the respective battery modules B.

The second nozzle 508 is connected to the second side of the second connection portion 504, and is configured to discharge the fire extinguishing gas received from the second connection portion 504. The second nozzle 508 is installed, for example, on the ceiling of the battery room R, and is configured to discharge the fire extinguishing gas to the battery modules B or other combustible materials inside the loading box (not illustrated). One or a plurality of second nozzles 508 may be provided according to the size of the battery room R.

Hereinafter, the operation of the battery fire suppression system with the fire extinguishing agent cooling function according to the first exemplary embodiment of the present disclosure will be described.

First, when detecting a fire, the fire detection sensor 600 transmits a detection signal to the controller 700. The controller 700 controls the agent feeder 100 to supply the fire extinguishing agent into the heat exchanger 300, and controls the gas feeder 200 to supply the fire extinguishing gas to the cooling part 340 of the heat exchanger 300. Then, the fire extinguishing gas supplied to the cooling part 340 serves as the refrigerant for cooling the cooling part 340 and then is discharged to the second connection portion 504, while the fire extinguishing agent supplied into the heat exchanger 300 is cooled by heat exchange with the cooling part 340.

The fire extinguishing agent is discharged from the heat exchanger 300 to the battery module B through the first connection portion 502 and the first nozzle 506 in a state of being cooled to a considerably low temperature. Thus, it is possible to quickly extinguish the fire in the battery module B and at the same time cool neighboring battery modules B adjacent to the battery module B where the fire has occurred, thereby blocking thermal runaway of the battery modules B.

The fire extinguishing gas, which served as the refrigerant in the heat exchanger 300, is discharged to the battery module B or other combustible materials through the second connection portion 504 and the second nozzle 508. Thus, it is possible to prevent a fire in the battery room R. In other words, combustible materials are loaded in the battery room R in addition to the battery module B. Since the fire extinguishing gas is sprayed from the ceiling of the battery room R, it is possible to extinguish a fire that has occurred in the combustible materials in the battery room R or prevent a fire from occurring in the combustible materials. In the present disclosure, the fire extinguishing gas not only can serve as the refrigerant, but also can prevent a fire by being sprayed around the battery room R.

Figure 2:
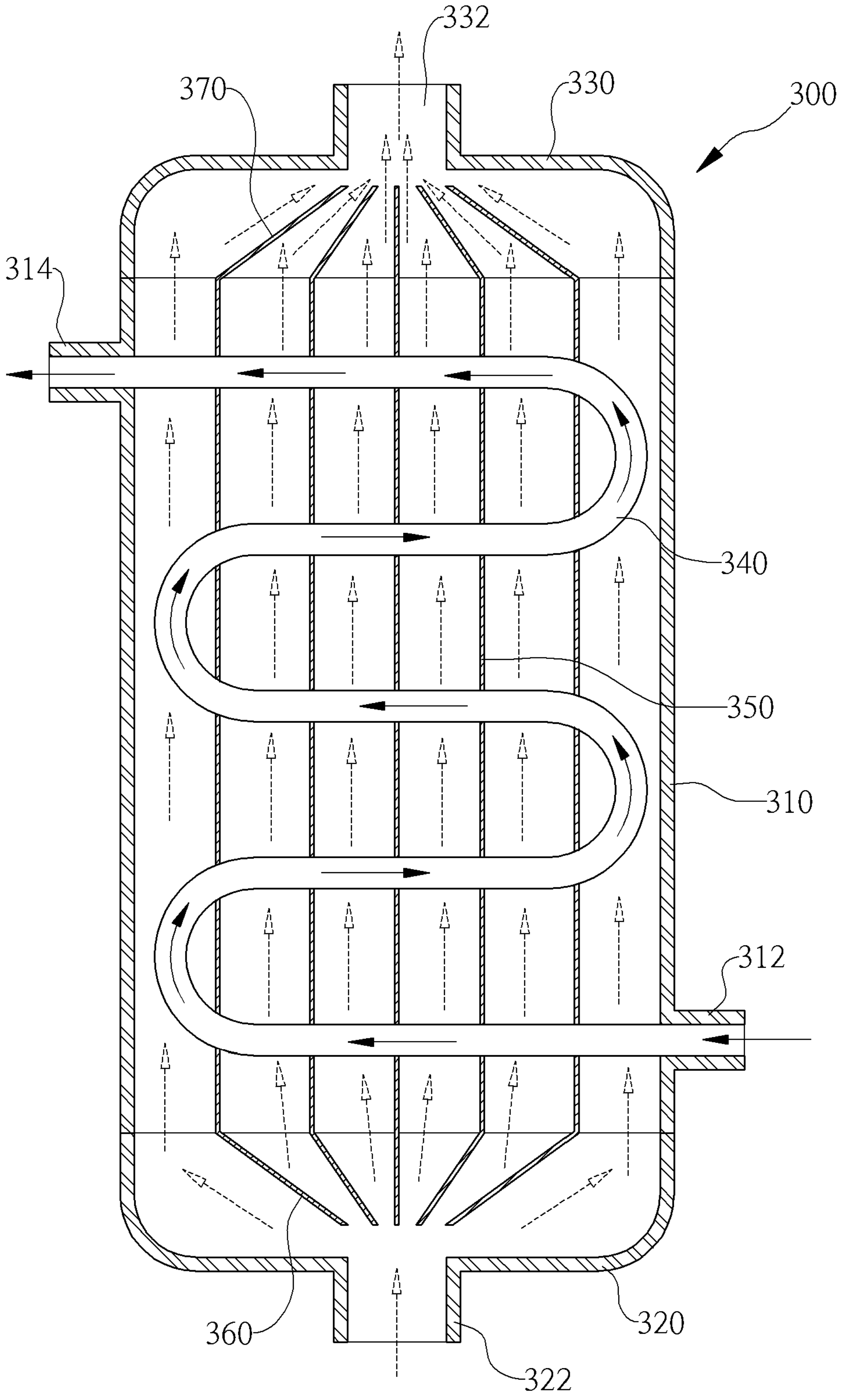
FIG. 2 is a view illustrating a heat exchanger according to the first exemplary embodiment of the present disclosure.

FIG. 2 is a view illustrating the heat exchanger 300 according to the first exemplary embodiment of the present disclosure.

Referring to FIGS. 1 and 2, the heat exchanger 300 includes the main body 310, the first closing part 320, and the second closing part 330. The cooling part 340 and the cooling plate 350 are provided inside the main body 310.

The cooling part 340 is formed in a tubular shape, and is disposed in a serpentine shape inside the main body 310. The first end of the cooling part 340 is connected to the second heat exchange inlet 312, and the second end of the cooling part 340 is connected to the second heat exchange outlet 314. The first heat exchange inlet 322 is connected to the gas feeder 200 so that the fire extinguishing gas discharged from the gas feeder 200 cools the cooling part 340 while passing through the cooling part 340.

The cooling plate 350 is formed in a plate shape. Here, a plurality of cooling plates 350 are arranged in parallel inside the main body 310. The cooling part 340 is disposed in a serpentine shape by passing through the plurality of cooling plates 350, and is configured to exchange heat with the cooling plates 350 in contact with the cooling plates 350. The fire extinguishing agent flowing into the main body 310 through the first heat exchange inlet 322 is divided and flows through the plurality of cooling plates 350 along the spaces between the cooling plates 350 and then is discharged through the first heat exchange outlet 332.

In addition, a first branch plate 360 and a second branch plate 370 may be further provided inside the main body 310. The first branch plate 360 is formed in a plate shape. Here, a plurality of first branch plates 360 are arranged at an inner first end portion of the main body 310. Each of the first branch plates 360 radially extends from the first heat exchange inlet 322 to a first end of each of the cooling plates 350. The second branch plate 370 is formed in a plate shape. Here, a plurality of second branch plates 370 are arranged at an inner second end portion of the main body 310. Each of the second branch plates 370 radially extends from the first heat exchange outlet 332 to a second end of each of the cooling plates 350.

The fire extinguishing agent flowing into the main body 310 through the first heat exchange inlet 322 is guided to the cooling plates 350 through the first branch plates 360, so that the fire extinguishing agent flowing into the main body 310 is uniformly distributed to each of the cooling plates 350. As described above, the fire extinguishing agent flowing into the main body 310 can move to the cooling plates 350 in a uniformly distributed state without being concentrated to either side inside the main body 310 while passing through the first branch plates 360.

In addition, since the fire extinguishing agent moved to the cooling plates 350 exchanges heat with the cooling plates 350 and the cooling part 340 while passing between the cooling plates 350, it is possible to improve heat exchange efficiency. In addition, when the fire extinguishing agent flowing into the main body 310 is discharged through the first heat exchange outlet 332 after passing through the cooling plates 350, the fire extinguishing agent located at the ends of the cooling plates 350 can be quickly guided to the first heat exchange outlet 332 through the second branch plates 370.

Figure 3:
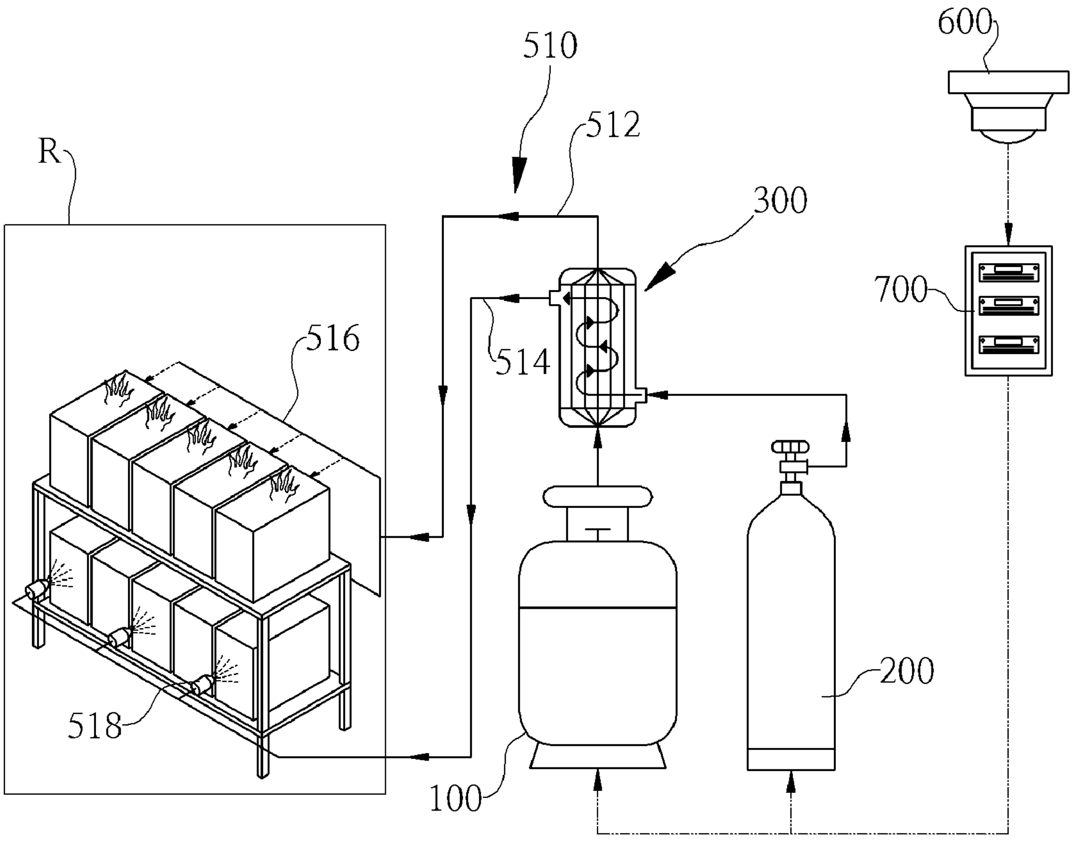
FIG. 3 is a schematic view illustrating a battery fire suppression system with a fire extinguishing agent cooling function according to a second exemplary embodiment of the present disclosure.

FIG. 3 is a schematic view illustrating a battery fire suppression system with a fire extinguishing agent cooling function according to a second exemplary embodiment of the present disclosure.

Referring to FIG. 3, the battery fire suppression system with the fire extinguishing agent cooling function according to the second exemplary embodiment of the present disclosure includes a fire detection sensor 600, a controller 700, an agent feeder 100, a gas feeder 200, a heat exchanger 300, and a connection member 510. Since the fire detection sensor 600, the controller 700, the agent feeder 100, the gas feeder 200, and the heat exchanger 300 remain similar to those of the first embodiment, detailed descriptions thereof will be omitted.

The connection member 510 includes a first connection part 512, a second connection part 514, a first nozzle 516, and a second nozzle 518. The first connection portion 512 extends toward a battery module B in connection with a first heat exchange outlet 332. A plurality of battery cells are stacked in the battery module B. The battery cells may have a prismatic shape.

The second connection portion 514 extends toward the battery module B in connection with a second heat exchange outlet 314. The first nozzle 516 is positioned to face the inside of the battery module B, and the second nozzle 518 is positioned to face the surface of the battery module B. The first connection portion 512 is connected to the first nozzle 516, and the second connection portion 514 is connected to the second nozzle 518. Here, a plurality of battery modules B are mounted in a battery room R. A plurality of first nozzles 516 are provided so that each of the first nozzles 516 faces the inside of each of the battery modules B. The first connection portion 512 is integrally connected to the respective first nozzles 516. A plurality of second nozzles 518 are provided so that each of the second nozzles 518 faces the surface of each of the battery modules B. The second connection portion 514 is integrally connected to the respective second nozzles 518.

As a fire extinguishing agent is discharged through the first nozzle 516 to the inside of a battery module B where a fire has occurred, the cooled fire extinguishing agent extinguishes and cools the inside of the battery module B. At the same time, a fire extinguishing gas is discharged through the second nozzle 518 to the vicinity of the battery module B where the fire has occurred, that is, the surface of the battery module B, thereby cooling the outside of the battery module B. Thus, it is possible to break a chain of reactions caused by the fire in the battery module B.

Meanwhile, the reason why the fire extinguishing gas is not sprayed to the inside of the battery module B in the second embodiment of the present disclosure is that since when the battery cells stacked in the battery module B have a prismatic shape, each of the battery cells is individually stored in a quadrangular outer casing and the possibility of fire propagation to neighboring battery cells is relatively low.

Figure 4:
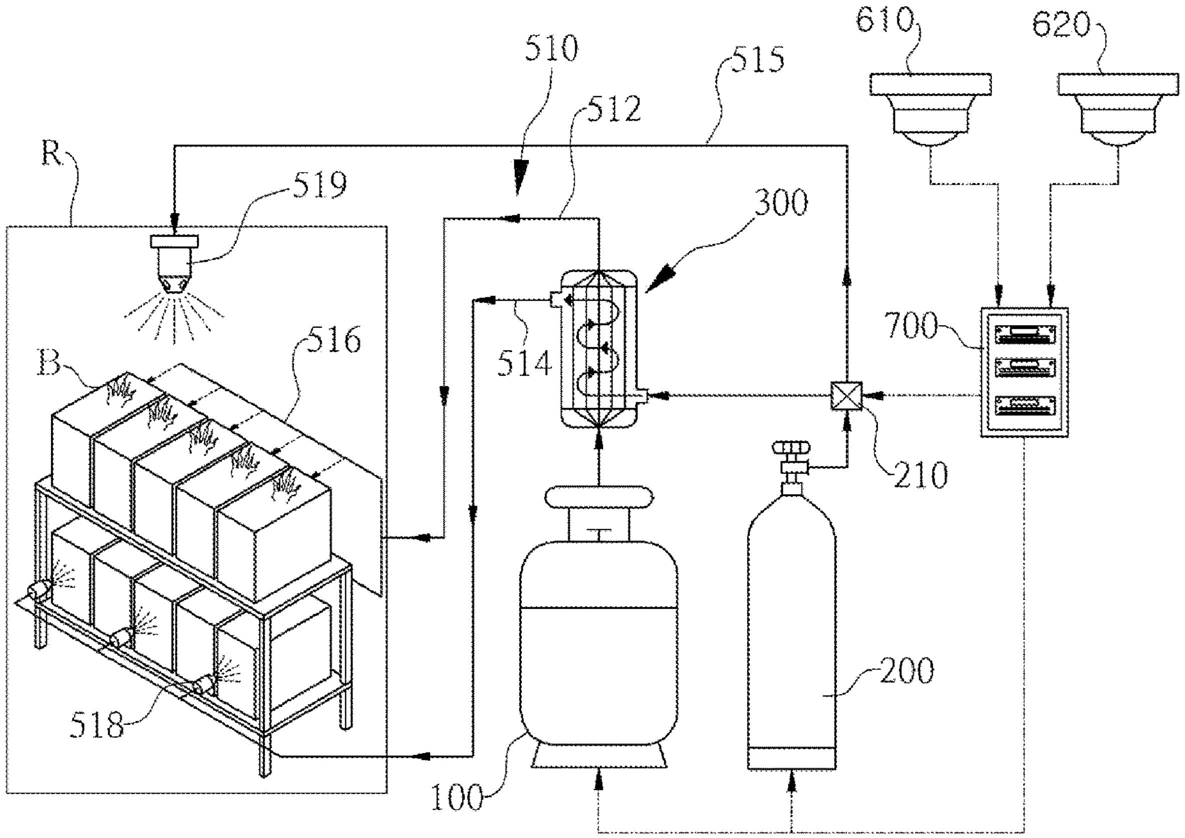
FIG. 4 is a schematic view illustrating a battery fire suppression system with a fire extinguishing agent cooling function according to a third exemplary embodiment of the present disclosure.

FIG. 4 is a schematic view illustrating a battery fire suppression system with a fire extinguishing agent cooling function according to a third exemplary embodiment of the present disclosure.

Referring to FIG. 4, the battery fire suppression system with the fire extinguishing agent cooling function according to the third exemplary embodiment of the present disclosure includes an agent feeder 100, a gas feeder 200, a heat exchanger 300, a first fire detection sensor 610, a second fire detection sensor 620, a control valve 210, a controller 700, and a connection member 510. Since the agent feeder 100, the gas feeder 200, and the heat exchanger 300 remain similar to those of the second embodiment, detailed descriptions thereof will be omitted.

The first fire detection sensor 610 is installed inside a battery module B, and is configured to generate a detection signal by detecting a fire that has occurred in the battery module B. For example, the first fire detection sensor 610 generates a detection signal by detecting smoke or heat caused by the fire that has occurred in the battery module B.

The second detection sensor 620 is installed in a battery room R where the battery module B is loaded, and is configured to generate a detection signal by detecting a fire that has occurred in the battery room R. For example, the second fire detection sensor 620 is installed on the ceiling of the battery room R, and generates a detection signal by detecting smoke or heat caused by a fire that has occurred in combustible materials other than the battery modules B loaded in the battery room R. In the present disclosure, the battery room R may be replaced with a loading box (not illustrated) in some cases. Although in FIG. 4 the first and second fire detection sensors 610 and 620 are illustrated above the controller 700, this is a schematic illustration only. In the third exemplary embodiment of the present disclosure, it is understood that the first fire detection sensor 610 is installed inside the battery module B, and the second fire detection sensor 620 is installed on a side inside the battery room R.

The control valve 210 is configured to receive a control signal from the controller 700 and selectively supply a fire extinguishing gas received from the gas feeder 200 to a second heat exchange inlet 312 or the connection member 510. The control valve 210 may be a solenoid valve or the like.

The controller 700 is configured to determine that a fire has occurred in the battery module B or the battery room R when receiving the detection signal from the first fire detection sensor 610 or the second fire detection sensor 620, and control the agent feeder 100 and the gas feeder 200 to discharge a fire extinguishing agent and the fire extinguishing gas. In addition, the controller 700 is configured to transmit a control signal to the control valve 210 when receiving the detection signal from the first fire detection sensor 610 or the second fire detection sensor 620, and control the control valve 210 to selectively supply the fire extinguishing gas received from the gas feeder 200 to the second heat exchange inlet 312 or the connection member 510.

The connection member 510 includes a first connection part 512, a second connection part 514, and a third connection part 515. The first and second connection portions 512 and 514 remain similar to those of the second embodiment. The third connection part 515 has a first side connected to the control valve 210 and a second side positioned at a side of the battery room R. In addition, a third nozzle 519 is mounted on the side of the battery room R. The third connection part 515 is connected to the third nozzle 519.

Hereinafter, the operation of the battery fire suppression system with the fire extinguishing agent cooling function according to the third exemplary embodiment of the present disclosure will be described. First, when detecting a fire, the first fire detection sensor 610 transmits a detection signal to the controller 700.

Upon reception of the detection signal from the first fire detection sensor 610, the controller 700 determines that the battery module B is on fire. Then, the controller 700 controls the agent feeder 100 to supply the fire extinguishing agent into the heat exchanger 300, and controls the gas feeder 200 to supply the fire extinguishing gas to the control valve 210. Subsequently, the controller 700 controls the control valve 210 to supply the fire extinguishing gas received from the gas feeder 200 to the second heat exchange inlet 312.

Then, the fire extinguishing gas supplied to a cooling part 340 through the second heat exchange inlet 312 serves as a refrigerant for cooling the cooling and then is discharged to the second connection part 514, while the fire extinguishing agent supplied into the heat exchanger 300 is cooled by heat exchange with the cooling part 340. The fire extinguishing agent is discharged from the heat exchanger 300 to the battery module B through the first connection part 512 and a first nozzle 516 in a state of being cooled to a considerably low temperature. Thus, it is possible to quickly extinguish the fire in the battery module B and at the same time cool neighboring battery modules B adjacent to the battery module B where the fire has occurred, thereby blocking thermal runaway of the battery modules B. The fire extinguishing gas, which served as the refrigerant in the heat exchanger 300, is discharged to the battery module B or other combustible materials through a second connection part 514 and a second nozzle 518. Thus, it is possible to prevent a fire in the battery room R.

Meanwhile, when detecting a fire, the second fire detection sensor 620 transmits a detection signal to the controller 700. Upon reception of the detection signal from the second fire detection sensor 620, the controller 700 determines that other combustible materials inside the battery room R other than the battery module B are on fire. Then, the controller 700 controls the agent feeder 100 to supply the fire extinguishing agent into the heat exchanger 300, and controls the gas feeder 200 to supply the fire extinguishing gas to the control valve 210. Subsequently, the controller 700 controls the control valve 210 to supply the fire extinguishing gas received from the gas feeder 200 to the third connection part 515 of the connection member 510. At this time, the controller 700 allows the control valve 210 to be opened first and then the gas feeder 200 to be opened so that the fire extinguishing gas supplied from the gas feeder 200 is quickly supplied to the third connection part 515 through the control valve 210.

Then, the fire extinguishing agent supplied into the heat exchanger 300 is discharged to the battery module B through the first connection part 512 and the first nozzle 516, thereby preventing the fire that has occurred in the combustible materials from propagating to the battery module B. At the same time, the fire extinguishing gas supplied to the third connection part 515 is discharged through the third nozzle 519 to the combustible materials in the battery room R to extinguish the fire in the battery room R.

Figure 5:
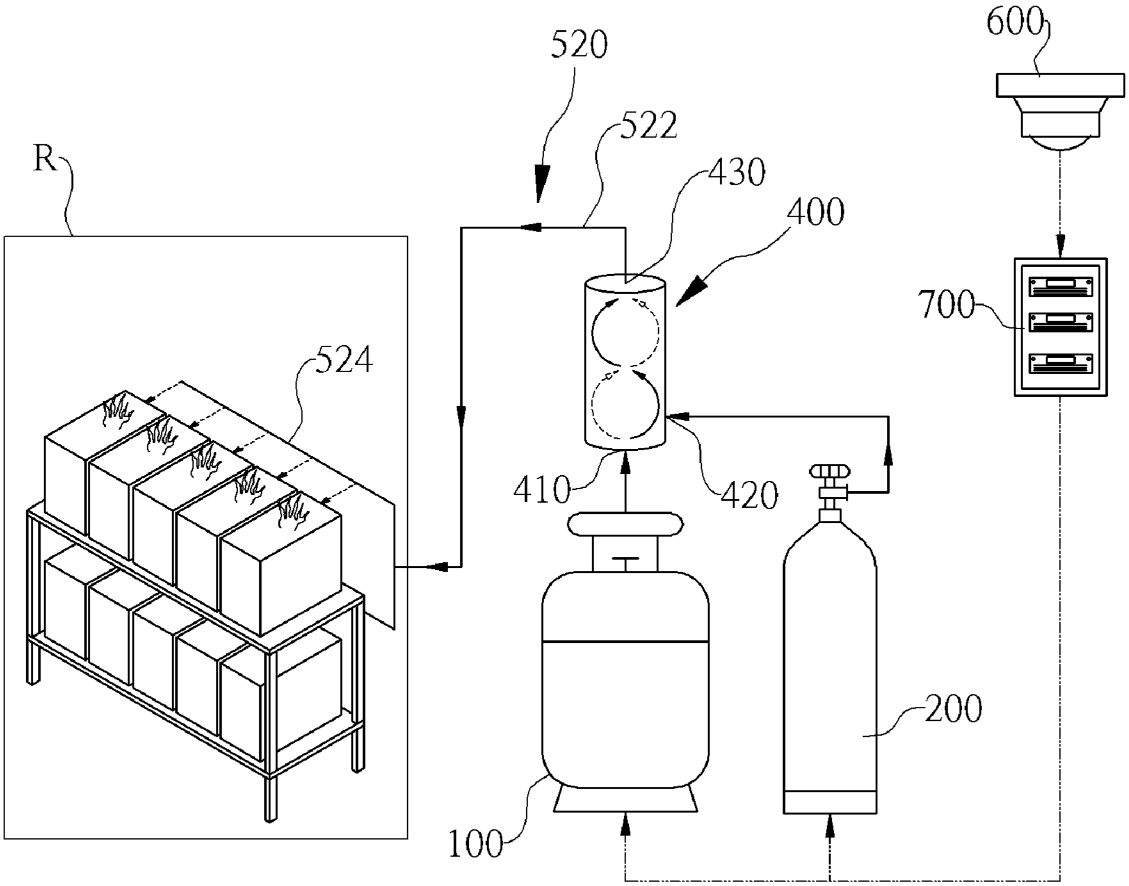
FIG. 5 is a schematic view illustrating a battery fire suppression system with a fire extinguishing agent cooling function according to a fourth exemplary embodiment of the present disclosure.

FIG. 5 is a schematic view illustrating a battery fire suppression system with a fire extinguishing agent cooling function according to a fourth exemplary embodiment of the present disclosure.

Referring to FIG. 5, the battery fire suppression system with the fire extinguishing agent cooling function according to the fourth exemplary embodiment of the present disclosure includes a fire detection sensor 600, a controller 700, an agent feeder 100, a gas feeder 200, an agitator 400, and a connection member 520. Since the fire detection sensor 600, the controller 700, the agent feeder 100, and the gas feeder 200 remain similar to those of the first embodiment, detailed descriptions thereof will be omitted.

The agitator 400 is configured to stir a fire extinguishing agent received from the agent feeder 100 and a fire extinguishing gas received from the gas feeder 200. The agitator 400 has a space therein, and has a first mixing inlet 410 and a second mixing inlet 420 on a first side thereof and a mixing outlet 430 on a second side thereof.

The connection member 520 includes a mixing connection part 522 and a nozzle 524. The mixing connection part 522 is formed in a tubular shape, and has a first side connected to the mixing outlet 430 and a second side extending toward a battery module B. The nozzle 524 is positioned to face the inside of the battery module B. The second side of the mixing connection part 522 is connected to the nozzle 524.

When a fire occurs, the agent feeder 100 supplies the fire extinguishing agent to the agitator 400 through the first mixing inlet 410, and the gas feeder 200 supplies the fire extinguishing gas to the agitator 400 through the second mixing inlet 420. Then, the fire extinguishing agent flowing into the agitator 400 through the first mixing inlet 410 is uniformly mixed with the fire extinguishing gas flowing into the agitator 400 through the second mixing inlet 420 to produce a mixed agent. At this time, since the fire extinguishing gas is cooled carbon dioxide, the fire extinguishing agent flowing into the agitator 400 is cooled by heat exchange with the fire extinguishing gas. As a result, the mixed agent is discharged through the mixing outlet 430 in a cooler state than the fire extinguishing agent. Also, since the mixing connection part 522 is connected to the mixing outlet 430, the mixed agent from the mixing outlet 430 passes through the mixing connection part 522 and is then discharged through the nozzle 524, thereby extinguishing the fire in the battery module B and cooling the inside of the battery module B.

Meanwhile, the reason why the mixed agent is sprayed to the inside of the battery module B in the fourth embodiment of the present disclosure is that since when a plurality of battery cells stacked in the battery module B have a pouch shape, each of the battery cells is individually stored in a fragile pouch and the possibility of fire propagation to neighboring battery cells is relatively low. Thus, more fire extinguishing agents and a higher level of cooling effect per battery module B are required compared to the previous embodiments. To meet this, the mixed agent in which the fire extinguishing agent and fire extinguishing gas are mixed is sprayed to the inside of the battery module B.

As described above, in the present disclosure, while allowing the fire extinguishing gas to basically serve as a refrigerant, depending on the amount of combustible materials loaded in a battery room R, the shape of the battery cells installed inside the battery module B, the battery capacity, etc., it is possible to selectively determine whether to allow the fire extinguishing gas to serve only as the refrigerant, or to allow the fire extinguishing gas to be sprayed to the battery module B where the fire has occurred to cool the surface of the battery module B or directly extinguish the fire in the battery module B.

Figure 6:
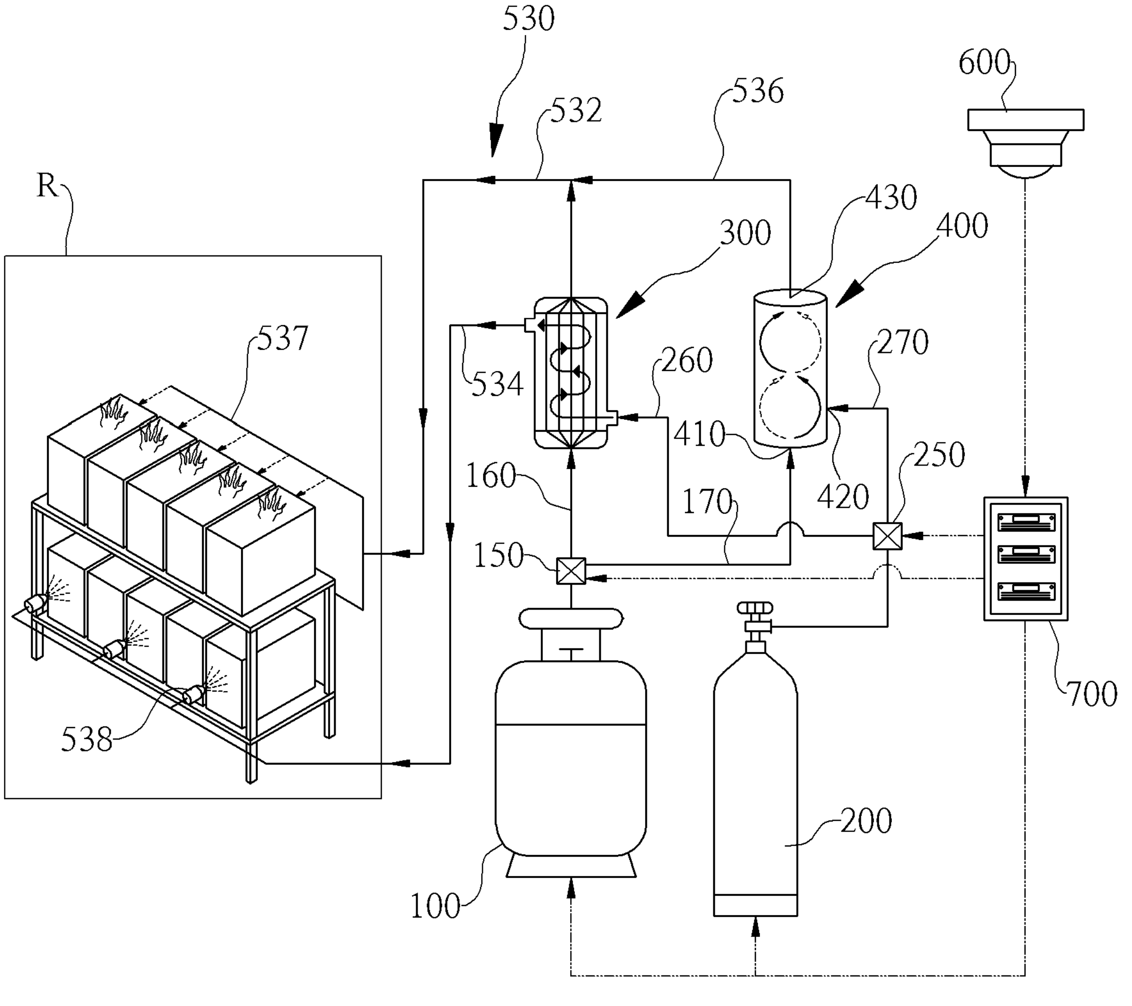
FIG. 6 is a schematic view illustrating a battery fire suppression system with a fire extinguishing agent cooling function according to a fifth exemplary embodiment of the present disclosure.

FIG. 6 is a schematic view illustrating a battery fire suppression system with a fire extinguishing agent cooling function according to a fifth exemplary embodiment of the present disclosure.

Referring to FIG. 6, the battery fire suppression system with the fire extinguishing agent cooling function according to the fifth exemplary embodiment of the present disclosure includes a fire detection sensor 600, a controller 700, an agent feeder 100, a gas feeder 200, a heat exchanger 300, an agitator 400, a first control valve 150, a second control valve 250, and connection member 530. Since the fire detection sensor 600, the controller 700, the agent feeder 100, the gas feeder 200, the heat exchanger 300, and the agitator 400 remain similar to those of the previous embodiments, detailed descriptions thereof will be omitted.

The first control valve 150 is configured to selectively supply a fire extinguishing agent received from the agent feeder 100 to a first heat exchange inlet 322 or a first mixing inlet 410 under control of the controller 700.

The second control valve 250 is configured to selectively supply a fire extinguishing gas received from the gas feeder 200 to a second heat exchange inlet 312 or a second mixing inlet 420 under control of the controller 700.

The connection member 530 has a first side connected to each of a first heat exchange outlet 332, a second heat exchange outlet 314, and a mixing outlet 430, and a second side extending toward the battery module B. The connection member 530 includes a first connection part 532, a second connection part 534, a mixing connection part 536, a first nozzle 537, and a second nozzle 538. The first connection part 532 has a first side connected to the first heat exchange outlet 332 and a second side extending toward the battery module B. The second connection part 534 has a first side connected to the second heat exchange outlet 314 and a second side extending toward the battery module B. The mixing connection part 536 has a first side connected to the mixing outlet 430 and a second side extending toward the battery module B. The first nozzle 537 is positioned to face the inside of the battery module B. The second side of the first connection part 532 is connected to the first nozzle 537. The second nozzle 538 is positioned to face the surface of the battery module B. The second side of the second connection part 534 is connected to the second nozzle 538. The second side of the mixing connection part 536 is connected to the first connection part 532, and is connected to the first nozzle 537 through the first connection part 532.

Meanwhile, the mixing connection part 536 may be directly connected to a separate mixing nozzle (not illustrated) formed to face the inside of the battery module B, without being connected to the first connection part 532.

Hereinafter, the operation of the battery fire suppression system with the fire extinguishing agent cooling function according to the fifth exemplary embodiment of the present disclosure will be described.

Figure 7:
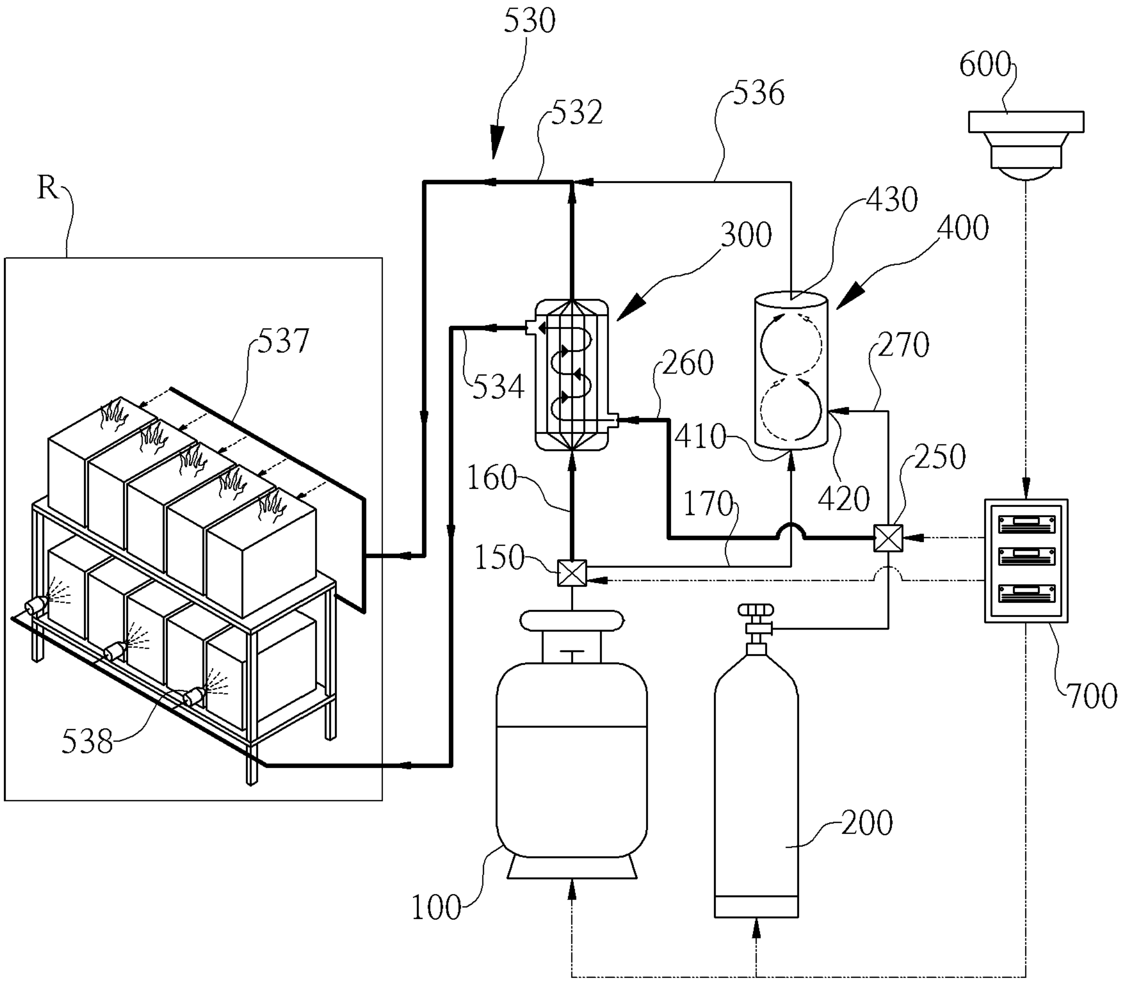
FIG. 7 is a view schematically illustrating a state in which a heat exchange mode is performed in the battery fire suppression system with the fire extinguishing agent cooling function according to the fifth exemplary embodiment of the present disclosure.

FIG. 7 is a view schematically illustrating a state in which a heat exchange mode is performed in the battery fire suppression system with the fire extinguishing agent cooling function according to the fifth exemplary embodiment of the present disclosure.

Referring to FIG. 7, a user manipulates an input part (not illustrated) to transmit a selected mode among the heat exchange mode and a mixing mode, that is, the heat exchange mode, to the controller 700. Thereafter, when the fire detection sensor 600 detects a fire, a detection signal is transmitted to the controller 700. Upon reception of the detection signal from the fire detection sensor 600, the controller 700 determines that the battery module B is on fire.

Then, upon reception of the heat exchange mode, the controller 700 controls the first control valve 150 to supply the fire extinguishing agent received from the agent feeder 100 to the first heat exchange inlet 322, and controls the second control valve 250 to supply the fire extinguishing gas received from the gas feeder 200 to the second heat exchange inlet 312.

The fire extinguishing gas flowing into a cooling part 340 through the second heat exchange inlet 312 serves as a refrigerant for cooling the cooling part 340 and then is discharged through the second heat exchange outlet 314. Subsequently, the fire extinguishing gas is discharged through the second nozzle 538 connected to the second heat exchange outlet 314 to the vicinity of the battery module B where the fire has occurred, that is, the surface of the battery module B, thereby cooling the outside of the battery module B and thus breaking a chain of reactions.

The fire extinguishing agent flowing into the heat exchanger 300 through the first heat exchange inlet 322 is discharged through the first heat exchange outlet 332 in a state of being subjected to heat exchange with the cooling part 340. At this time, the fire extinguishing agent is discharged through the first nozzle 537 connected to the first heat exchange outlet 332 to the inside of the battery module B where the fire has occurred, thereby extinguishing the fire in the battery module B and cooling the inside of the battery module B.

Figure 8:
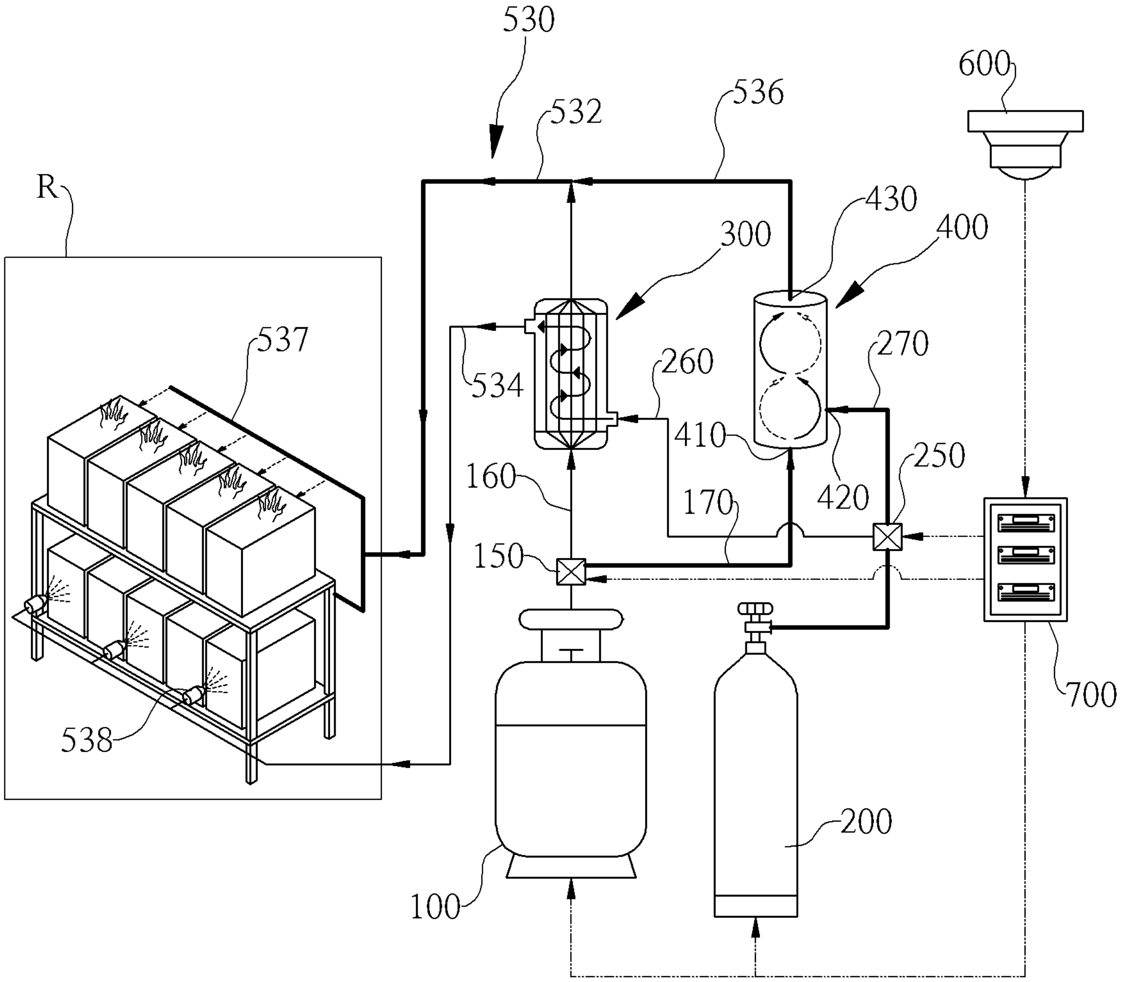
FIG. 8 is a view schematically illustrating a state in which a mixing mode is performed in the battery fire suppression system with the fire extinguishing agent cooling function according to the fifth exemplary embodiment of the present disclosure.

FIG. 8 is a view schematically illustrating a state in which the mixing mode is performed in the battery fire suppression system with the fire extinguishing agent cooling function according to the fifth exemplary embodiment of the present disclosure.

Referring to FIG. 8, the user manipulates the input part (not illustrated) to transmit a selected mode among the heat exchange mode and the mixing mode, that is, the mixing mode, to the controller 700. Thereafter, when the fire detection sensor 600 detects a fire, a detection signal is transmitted to the controller 700. Upon reception of the detection signal from the fire detection sensor 600, the controller 700 determines that the battery module B is on fire.

Then, upon reception of the mixing mode, the controller 700 controls the agent feeder 100 to supply the fire extinguishing agent to the first control valve 150, and controls the gas feeder 200 to supply the fire extinguishing gas to the second control valve 250. Subsequently, the controller 700 controls the first control valve 150 to supply the fire extinguishing agent received from the agent feeder 100 to the first mixing inlet 410, and controls the second control valve 250 to supply the fire extinguishing gas received from the gas feeder 200 to the second mixing inlet 420.

Then, the fire extinguishing agent flowing into the agitator 400 through the first mixing inlet 410 is uniformly mixed with the fire extinguishing gas flowing into the agitator 400 through the second mixing inlet 420 to produce a mixed agent. At this time, since the fire extinguishing gas is cooled carbon dioxide, the fire extinguishing agent flowing into the agitator 400 is cooled by heat exchange with the fire extinguishing gas. As a result, the mixed agent is discharged through the mixing outlet 430 in a cooler state than the fire extinguishing agent. Since the mixing connection part 536 is connected to the mixing outlet 430, the mixed agent from the mixing outlet 430 sequentially passes through the mixing connection part 536 and the first connection part 532 and is then discharged through the first nozzle 537, thereby extinguishing the fire in the battery module B and cooling the inside of the battery module B.

As described above, in the present disclosure, depending on the amount of combustible materials loaded in a battery room R, the shape of the battery cells installed inside the battery module B, the battery capacity, etc., it is possible to appropriately control the controller 700 to selectively determine whether to allow the fire extinguishing gas to serve only as the refrigerant, or to allow the fire extinguishing gas to be sprayed to the battery module B where the fire has occurred to cool the surface of the battery module B or directly extinguish the fire in the battery module B.

Figure 9:
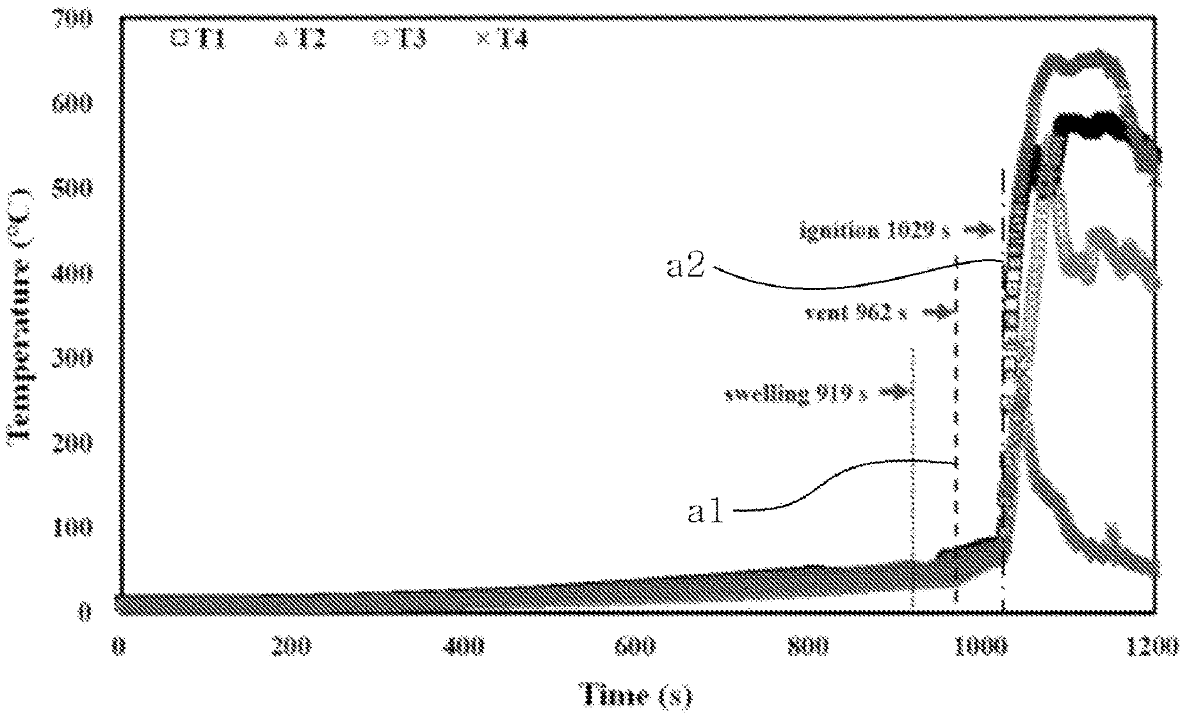
FIG. 9 is a graph illustrating a temperature change over time detected by a fire detection sensor of a battery fire suppression system with a fire extinguishing agent cooling function according to a sixth exemplary embodiment of the present disclosure.

FIG. 9 is a graph illustrating a temperature change over time detected by a fire detection sensor of a battery fire suppression system with a fire extinguishing agent cooling function according to a sixth exemplary embodiment of the present disclosure.

Referring to FIGS. 7 and 9, in the fifth embodiment, when the fire detection sensor 600 detects a fire in a state in which the user manipulates the input part (not illustrated) to transmit the selected mode from among the heat exchange mode and the mixing mode to the controller 700, the controller 700 performs the heat exchange mode or mixing mode selected by the user.

On the contrary, in the sixth embodiment, a controller 700 is configured to determine whether a temperature detected by a fire detection sensor 600 exceeds a preset threshold limit, and select and perform one of a heat exchange mode and a mixing mode on the basis of the determination result.

In other words, referring to the graph illustrated in FIG. 9, the temperature detected by the fire detection sensor 600 is not very high until a first time a1. In this state, the controller 700 determines that there is no smoke generated inside a battery module B, and only temperature is rising.

Subsequently, when the temperature detected by the fire detection sensor 600 exceeds the threshold limit measured at the first time a1, the controller 700 determines that a dangerous state has been reached and performs the heat exchange mode. In other words, the controller 700 opens an agent feeder 100 and a gas feeder 200, and then controls the agent feeder 100 to supply a fire extinguishing agent to a first control valve 150 and controls the gas feeder 200 to supply a fire extinguishing gas to a second control valve 250.

The fire extinguishing gas flowing into a cooling part 340 through a second heat exchange inlet 312 serves as a refrigerant for cooling the cooling part 340 and then is discharged through a second heat exchange outlet 314. Subsequently, the fire extinguishing gas is discharged through a second nozzle 538 connected to the second heat exchange outlet 314 to the vicinity of the battery module B where the fire has occurred, that is, the surface of the battery module B, thereby cooling the outside of the battery module B and thus breaking a chain of reactions.

The fire extinguishing agent flowing into a heat exchanger 300 through a first heat exchange inlet 322 is discharged through a first heat exchange outlet 332 in a state of being subjected to heat exchange with the cooling part 340. At this time, the fire extinguishing agent is discharged through a first nozzle 537 connected to the first heat exchange outlet 332 to the inside of the battery module B where the fire has occurred, thereby extinguishing the fire in the battery module B and cooling the inside of the battery module B.

Next, referring to FIGS. 8 and 9, a second time a2 indicates a situation in which the temperature detected by the fire detection sensor 600 explosively increases, that is, a situation in which a pre-thermal runaway state has entered. In this state, the fire detection sensor 600 detects heat and smoke simultaneously or only detects smoke without detecting heat. Thus, when the fire detection sensor 600 detects heat and smoke simultaneously or detects only smoke without detecting heat, the controller 700 determines that the pre-thermal runaway state has entered and performs the mixing mode. In other words, the controller 700 controls the agent feeder 100 to supply the fire extinguishing agent to the first control valve 150, and controls the gas feeder 200 to supply the fire extinguishing gas to the second control valve 250. Subsequently, the controller 700 controls the first control valve 150 to supply the fire extinguishing agent received from the agent feeder 100 to a first mixing inlet 410, and controls the second control valve 250 to supply the fire extinguishing gas received from the gas feeder 200 to a second mixing inlet 420.

Then, the fire extinguishing agent flowing into an agitator 400 through the first mixing inlet 410 is uniformly mixed with the fire extinguishing gas flowing into the agitator 400 through the second mixing inlet 420 to produce a mixed agent. At this time, since the fire extinguishing gas is cooled carbon dioxide, the fire extinguishing agent flowing into the agitator 400 is cooled by heat exchange with the fire extinguishing gas. As a result, the mixed agent is discharged through a mixing outlet 430 in a cooler state than the fire extinguishing agent. Since a mixing connection part 536 is connected to the mixing outlet 430, the mixed agent from the mixing outlet 430 sequentially passes through the mixing connection part 536 and a first connection part 532 and is then discharged through the first nozzle 537, thereby actively extinguishing the fire in the battery module B and cooling the inside of the battery module B.

Figure 10:
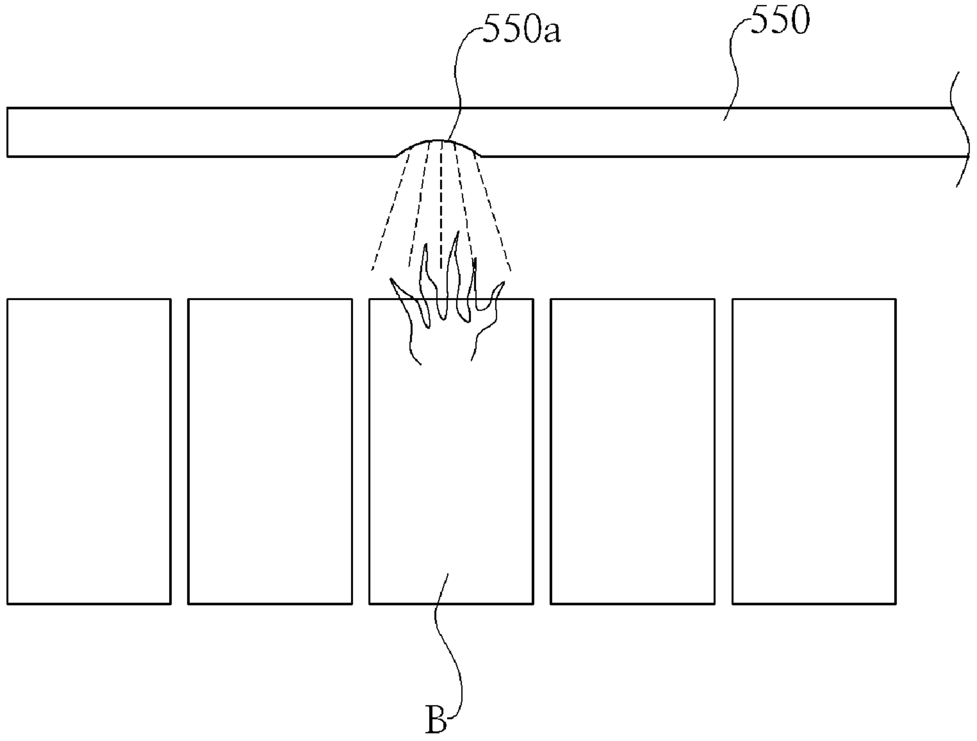
FIG. 10 is a view schematically illustrating a heat-sensitive insertion nozzle of a battery fire suppression system with a fire extinguishing agent cooling function according to a seventh exemplary embodiment of the present disclosure.

FIG. 10 is a view schematically illustrating a heat-sensitive insertion nozzle 550 of a battery fire suppression system with a fire extinguishing agent cooling function according to a seventh exemplary embodiment of the present disclosure.

Referring to FIG. 10, instead of a first nozzle 506, 516, 537, a second nozzle 508, 518, 538, or a nozzle 524 which are disposed on a side of a battery module B, the heat-sensitive insertion nozzle 550 may be provided. The heat-sensitive insertion nozzle 550 is connected to, for example, a first connection part 502, 512, 532, a second connection part 504, 514, 534, or a mixing connection part 522, and is configured to receive a fire extinguishing agent, a fire extinguishing gas, or a mixed agent from the first connection part 502, 512, 532, the second nozzle 508, 518, 538, or the mixing connection part 522.

The heat-sensitive insertion nozzle 550 is a tube that responds to heat and is configured to be melted or ruptured at a corresponding location when a fire occurs and temperature rises above a predetermined level. At this time, the fire extinguishing agent, the fire extinguishing gas, or the mixed agent pressurizedly supplied into the heat-sensitive insertion nozzle 550 is discharged and sprayed to the location where a fire has occurred through a ruptured open space, that is, a perforation 550*a*. In other words, when a fire or overheating occurs in the battery module B, a predetermined portion of the heat-sensitive insertion nozzle 550 located on the side of the battery module B is melted or ruptured to form the perforation 550*a*. The fire extinguishing agent, the fire extinguishing gas, or the mixed agent is locally discharged to the battery module B where the fire has occurred through the perforation 550*a* of the heat-sensitive insertion nozzle 550.

As described above, in the present disclosure, since a fire extinguishing fluid such as the fire extinguishing agent, the fire extinguishing gas, or the mixed agent is locally discharged through the perforation 550*a* formed in the heat-sensitive insertion nozzle 550 due to a fire or overheating of the battery module B, it is possible to directly discharge the fire extinguishing fluid to the battery module B where the fire or overheating has occurred.

Figure 11:
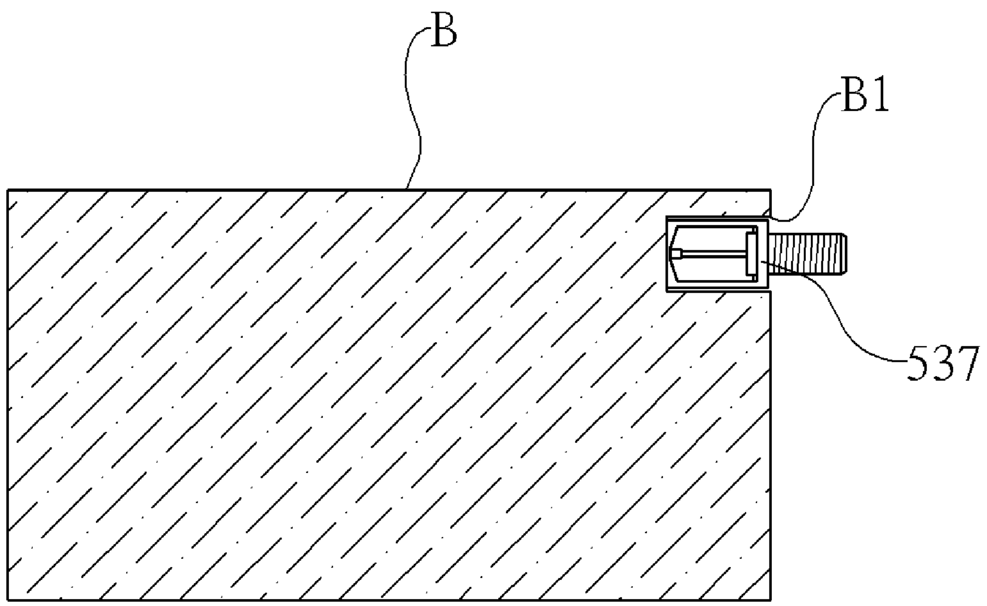
FIG. 11 is a view schematically illustrating an insertion nozzle of a battery fire suppression system with a fire extinguishing agent cooling function according to an eighth exemplary embodiment of the present disclosure.

FIG. 11 is a view schematically illustrating an insertion nozzle 540 of a battery fire suppression system with a fire extinguishing agent cooling function according to an eighth exemplary embodiment of the present disclosure.

Referring to FIG. 11, instead of a first nozzle 506, 516, 537, a second nozzle 508, 518, 538, or a nozzle 524 which are disposed on a side of a battery module B, the insertion nozzle 540 in the form of a glass bulb may be provided.

The insertion nozzle 550 is connected to, for example, a first connection part 502, 512, 532, a second connection part 504, 514, 534, or a mixing connection part 522, and is configured to receive a fire extinguishing agent, a fire extinguishing gas, or a mixed agent from the first connection part 502, 512, 532, the second nozzle 508, 518, 538, or the mixing connection part 522. The insertion nozzle 540 is inserted into a through-hole B1 formed through an outer surface of the battery module B, and is configured to discharge the fire extinguishing agent, the fire extinguishing gas, or the mixed agent to the inside of the battery module B.

Although preferred embodiments of the present disclosure have been described for illustrative purposes, those skilled in the art will appreciate that various modifications, additions, and substitutions are possible, without departing from the scope and spirit of the present disclosure as disclosed in the accompanying claims.

What is claimed is:

1. A battery fire suppression system with a fire extinguishing agent cooling function, the system comprising:

a heat exchanger having, on a first side thereof, a first heat exchange inlet and a second heat exchange inlet and, on a second side thereof, a first heat exchange outlet and a second heat exchange outlet, the heat exchanger being provided with a cooling part therein that connects the second heat exchange inlet and the second heat exchange outlet to each other;

an agent feeder configured to supply a fire extinguishing agent to the first heat exchange inlet;

a gas feeder configured to supply a fire extinguishing gas to the second heat exchange inlet;

a first fire detection sensor configured to be placed inside a battery module;

a second fire detection sensor configured to be placed in a battery room in which the battery module is loaded;

a control valve fluidly connected to the second heat exchange inlet and a connection member, and configured to selectively supply the fire extinguishing gas received from the gas feeder to the second heat exchange inlet or the connection member; and a controller configured to control the control valve to supply the fire extinguishing gas received from the gas feeder to the second heat exchange inlet when receiving a detection signal from the first fire detection sensor, and control the control valve to supply the fire extinguishing gas received from the gas feeder to the connection member when receiving a detection signal from the second fire detection sensor, wherein the connection member comprises a first connection part having a first side connected to the first heat exchange outlet and a second side, a second connection part having a first side connected to the second heat exchange outlet and a second side, and a third connection part having a first side connected to the control valve and a second side configured to be positioned at a side of the battery room, wherein the connection member further comprises a first nozzle configured to be positioned to face an inside of the battery module, a second nozzle configured to be positioned to face a surface of the battery module, a third nozzle configured to be mounted on the side of the battery room, the second side of the first connection part is connected to the first nozzle, the second side of the second connection part is connected to the second nozzle, and the second side of the third connection part is connected to the third nozzle, wherein the fire extinguishing gas flowing into the cooling part through the second heat exchange inlet serves as a refrigerant for cooling the cooling part and then is discharged through the second heat exchange outlet, and the fire extinguishing agent flowing into the heat exchanger through the first heat exchange inlet is discharged through the first heat exchange outlet in a state of being subjected to heat exchange with the cooling part.

2. The system of claim 1, wherein the heat exchanger comprises a main body having a space therein, a first closing part for closing a first end of the main body, and a second closing part for closing a second end of the main body, and the cooling part is disposed in a serpentine shape inside the main body, wherein the first heat exchange inlet is formed in the first closing part, the first heat exchange outlet is formed in the second closing part, the second heat exchange inlet is formed on a first side of the main body to be connected to a first end of the cooling part, and the second heat exchange outlet is formed on a second side of the main body to be connected to a second end of the cooling part.

3. The system of claim 2, wherein a plurality of cooling plates are arranged in parallel inside the main body, the fire extinguishing agent flowing into the main body through the first heat exchange inlet is divided and flows through the plurality of cooling plates along spaces between the cooling plates and then is discharged through the first heat exchange outlet, and the cooling part is disposed in the serpentine shape while passing through the plurality of the cooling plates to exchange heat with the cooling plates.

4. The system of claim 3, wherein a plurality of first branch plates are provided at an inner first end portion of the main body and are arranged so that each of the first branch plates radially extends from the first heat exchange inlet to a first end of each of the cooling plates, and a plurality of second branch plates are provided at an inner second end portion of the main body and are arranged so that each of the second branch plates radially extends from the first heat exchange outlet to a second end of each of the cooling plates.

* * * * *